(12) United States Patent
Willard et al.

(10) Patent No.: US 9,702,294 B2
(45) Date of Patent: Jul. 11, 2017

(54) REDUCING TURBOCHARGED ENGINE OVERHEATING

(71) Applicant: Ford Global Technologies, LLC, Dearborn, MI (US)

(72) Inventors: Karen Willard, Grosse Pointe Farms, MI (US); John Eric Rollinger, Troy, MI (US); Vincent Edward Mariucci, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 14/977,364

(22) Filed: Dec. 21, 2015

(65) Prior Publication Data
US 2016/0108794 A1 Apr. 21, 2016

Related U.S. Application Data

(63) Continuation of application No. 13/796,871, filed on Mar. 12, 2013, now Pat. No. 9,217,379.

(51) Int. Cl.
| | |
|---|---|
| *F02D 41/22* | (2006.01) |
| *F02D 35/02* | (2006.01) |
| *F01P 5/14* | (2006.01) |
| *F02D 13/06* | (2006.01) |
| *F02D 17/02* | (2006.01) |
| *F02D 17/04* | (2006.01) |

(52) U.S. Cl.
CPC ............... *F01P 5/14* (2013.01); *F02D 13/06* (2013.01); *F02D 17/02* (2013.01); *F02D 17/04* (2013.01); *F02D 35/025* (2013.01); *F02D 41/22* (2013.01); *F02D 2041/227* (2013.01); *Y02T 10/144* (2013.01); *Y02T 10/18* (2013.01)

(58) Field of Classification Search
CPC ........ F02D 17/02; F02D 17/04; F02D 31/001; F02D 13/06; F02D 2009/0277; F02D 11/107; F02D 41/1497; F02D 41/0087; F02D 41/22; F02D 2041/227; F02D 2041/0012; F02D 35/025; F02B 75/22; F02B 77/08; F01P 5/14; F02P 2031/36
USPC ........................................................ 123/198 F
See application file for complete search history.

(56) References Cited

U.S. PATENT DOCUMENTS

| | | | |
|---|---|---|---|
| 4,146,006 A | 3/1979 | Garabedian | |
| 5,070,832 A * | 12/1991 | Hapka | F01M 1/22 123/198 D |
| 5,094,192 A | 3/1992 | Seiffert et al. | |
| 5,133,303 A | 7/1992 | Umehara | |
| 5,555,871 A | 9/1996 | Gopp et al. | |
| 5,769,055 A * | 6/1998 | Motose | F01P 11/16 123/198 D |
| 6,712,651 B2 * | 3/2004 | Kanno | F01M 1/24 123/196 S |
| 6,715,289 B2 | 4/2004 | Mader et al. | |
| 6,786,190 B2 | 9/2004 | Wu et al. | |
| 6,941,245 B2 * | 9/2005 | Longnecker | F01P 7/167 702/184 |

(Continued)

*Primary Examiner* — Lindsay Low
*Assistant Examiner* — George Jin
(74) *Attorney, Agent, or Firm* — Julia Voutyras; McCoy Russell LLP

(57) ABSTRACT

A method comprising in response to coolant loss in a turbocharged engine, deactivating one or more engine cylinders while limiting engine load of one or more active cylinders based on an engine speed, and a cylinder head temperature.

13 Claims, 12 Drawing Sheets

(56) References Cited

U.S. PATENT DOCUMENTS

| | | |
|---|---|---|
| 7,073,488 B2 | 7/2006 | Hasler et al. |
| 7,204,235 B1 | 4/2007 | Gebby et al. |
| 7,836,866 B2 | 11/2010 | Luken et al. |
| 2005/0139400 A1 | 6/2005 | Gee |
| 2009/0118090 A1* | 5/2009 | Heap ............... B60K 6/445 477/98 |
| 2009/0204312 A1 | 8/2009 | Moriya |
| 2012/0221217 A1 | 8/2012 | Sujan et al. |
| 2014/0171257 A1* | 6/2014 | Harada ............ B60K 6/445 477/3 |
| 2014/0261315 A1* | 9/2014 | Willard ............ F02D 17/02 123/349 |
| 2014/0358401 A1* | 12/2014 | Montgomery ..... F02D 41/22 701/102 |

* cited by examiner

REDUCING TURBOCHARGED ENGINE OVERHEATING

CROSS REFERENCE TO RELATED APPLICATIONS

The present application is a continuation of U.S. patent application Ser. No. 13/796,871, entitled "REDUCING TURBOCHARGED ENGINE OVERHEATING," filed on Mar. 12, 2013, the entire contents of which are hereby incorporated by reference for all purposes.

BACKGROUND/SUMMARY

Engines may be cooled by circulating coolant fluid such as water through passageways in the engine. In the event of a cooling system degradation (e.g. water pump degradation) or loss of coolant (e.g. due to coolant system leak), engine metal components may overheat.

Gebby et al. (U.S. Pat. No. 7,204,235) address engine overheating in the event of cooling system degradation by alternately shutting down the fuel injectors to each bank of engine cylinders and air-cooling the deactivated engine cylinder bank with un-combusted intake air. Alternately deactivating each bank of cylinders can provide some engine torque for vehicle operation.

The inventors herein have recognized potential issues with the above approach. Namely, with turbocharged and other high-specific power output engines, traditional fail-safe cooling strategies, such as alternate deactivation and air-cooling of engine cylinder banks, may not maintain cylinder head temperatures below engine metal melting temperatures. Consequently, turbocharged engines are often disabled soon after initiation of traditional fail-safe cooling strategies. Furthermore, even if some cylinders maintain combustion during the cooling, the engine may not provide enough torque to sustain vehicle operability and vehicle driveability, particularly in turbocharged engines.

One approach that addresses the aforementioned issues is a method for a fail-safe cooling strategy (FSC), comprising deactivating one or more engine cylinders while limiting engine cylinder load in response to cooling system degradation and/or coolant loss in a turbocharged engine. Furthermore, the method may comprise deactivating one or more engine cylinders while limiting engine cylinder load in response to an engine cylinder temperature exceeding a second threshold temperature. The number of deactivated cylinders and the load limit may be chosen based on increasing torque while maintaining engine speed below a threshold engine speed, and maintaining engine cylinder temperatures below a third threshold temperature, the third threshold temperature greater than the second threshold temperature. In this manner, overheating of engine metal components can be reduced while sustaining vehicle operability and driveability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to a method of deactivating one or more engine cylinders while limiting engine load in response to coolant loss in a turbocharged engine. In one example, the method comprises deactivating one or more engine cylinders while limiting load of one or more active cylinders while maintaining an engine speed below a threshold engine speed and while maintaining an engine cylinder temperature below a third threshold temperature. In this manner, engine cylinder overheating can be mitigated while maintaining vehicle driveability and vehicle operability over a range of engine operating conditions.

Figure 1:
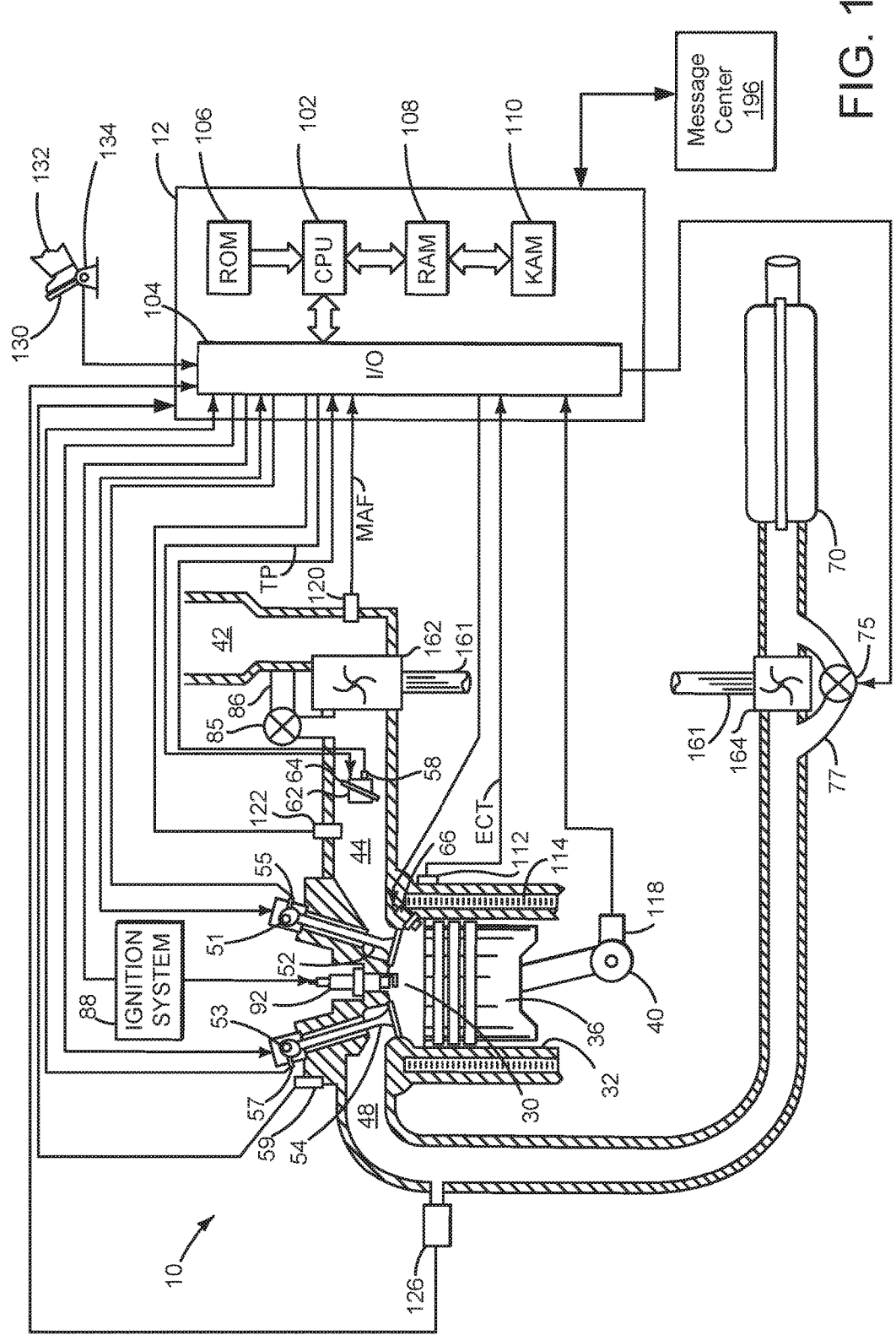
FIG. 1 shows a schematic depicting an example turbocharged engine.
Figure 2:
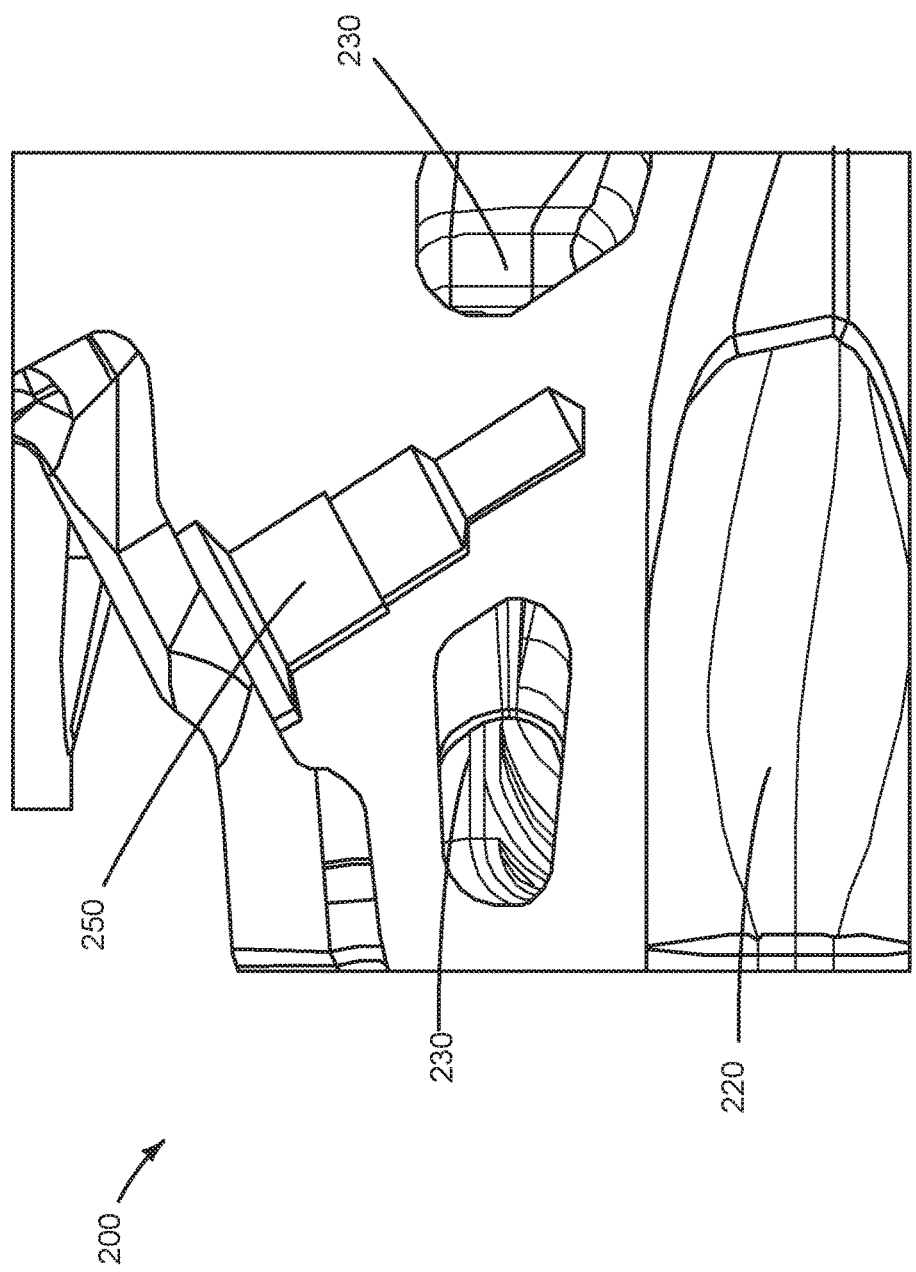
FIG. 2 shows a schematic depicting a partial-cross section of an example temperature sensor installed in an engine exhaust manifold.
Figure 3:
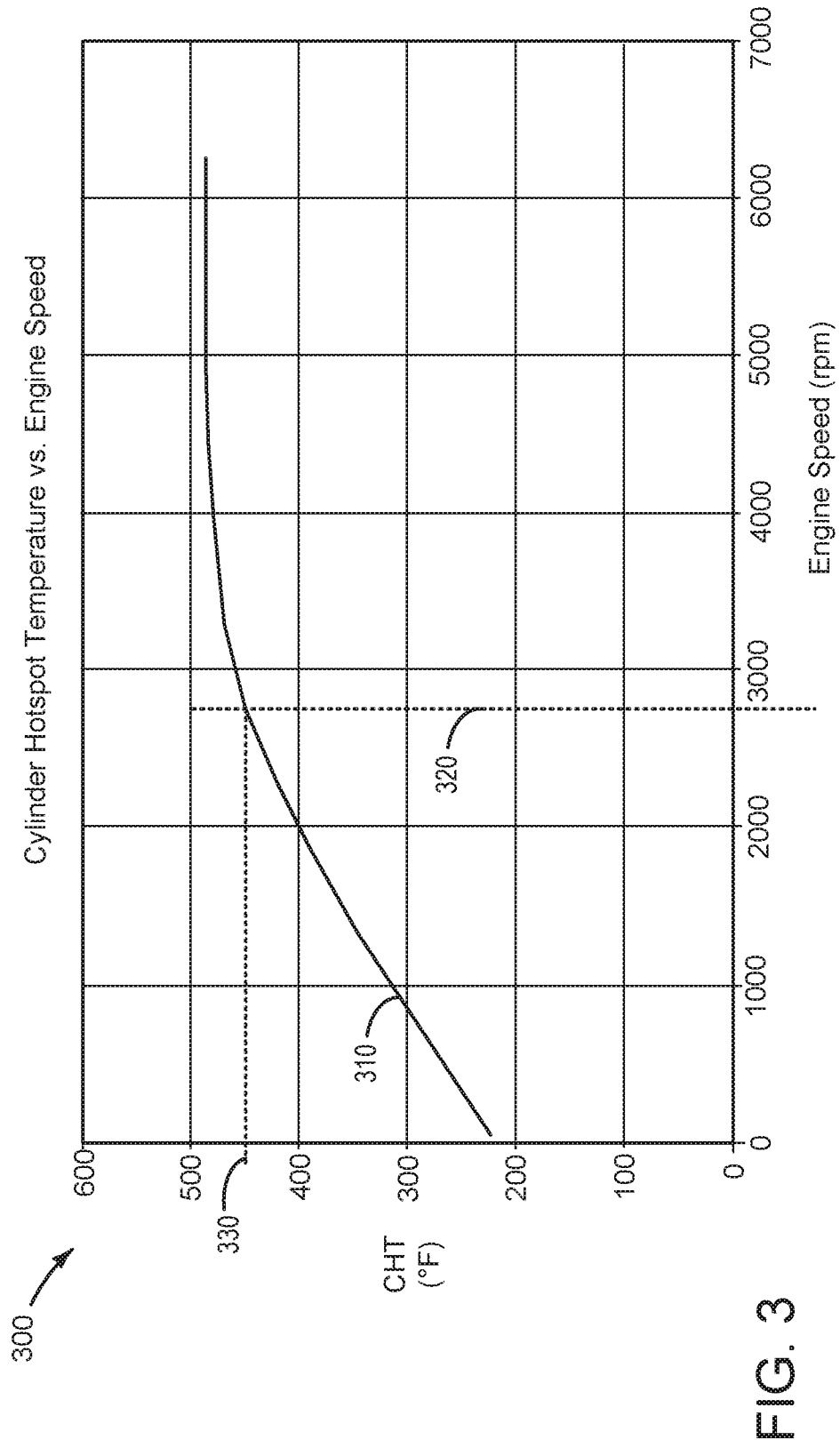
FIG. 3 shows an example plot of cylinder hotspot temperature vs. engine speed.
Figure 4:
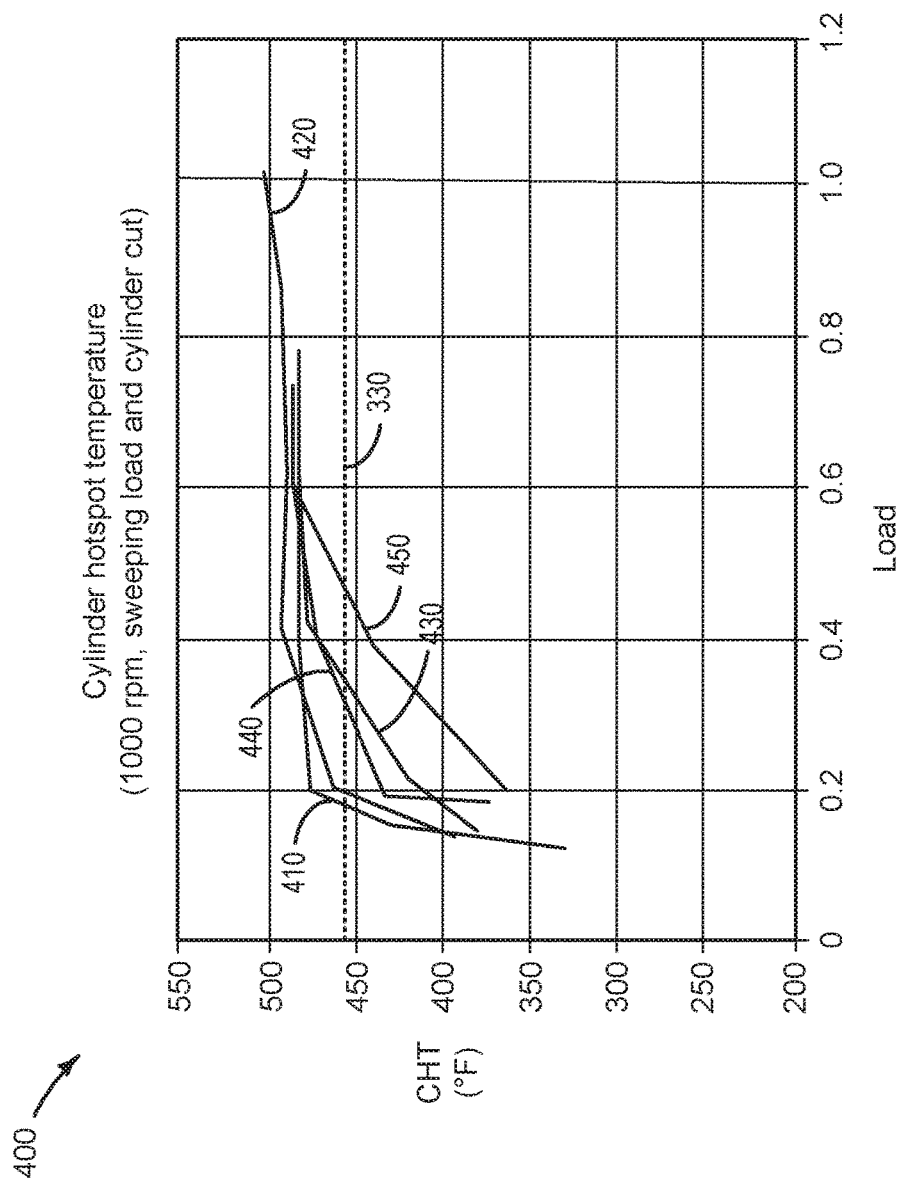
FIG. 4 shows an example plot of cylinder hotspot temperature vs. load.
Figure 5:
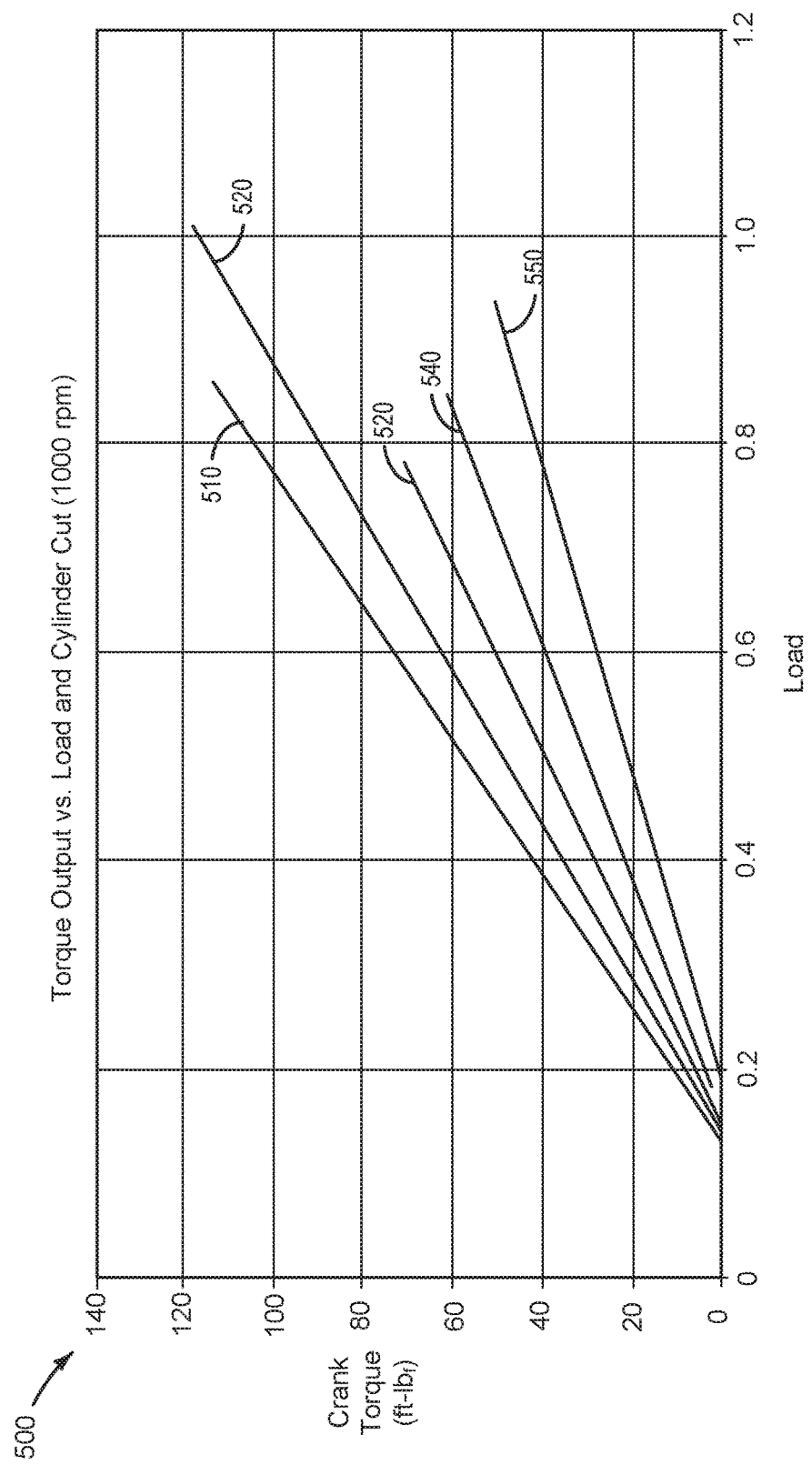
FIG. 5 shows an example plot of torque vs. load.
Figure 6:
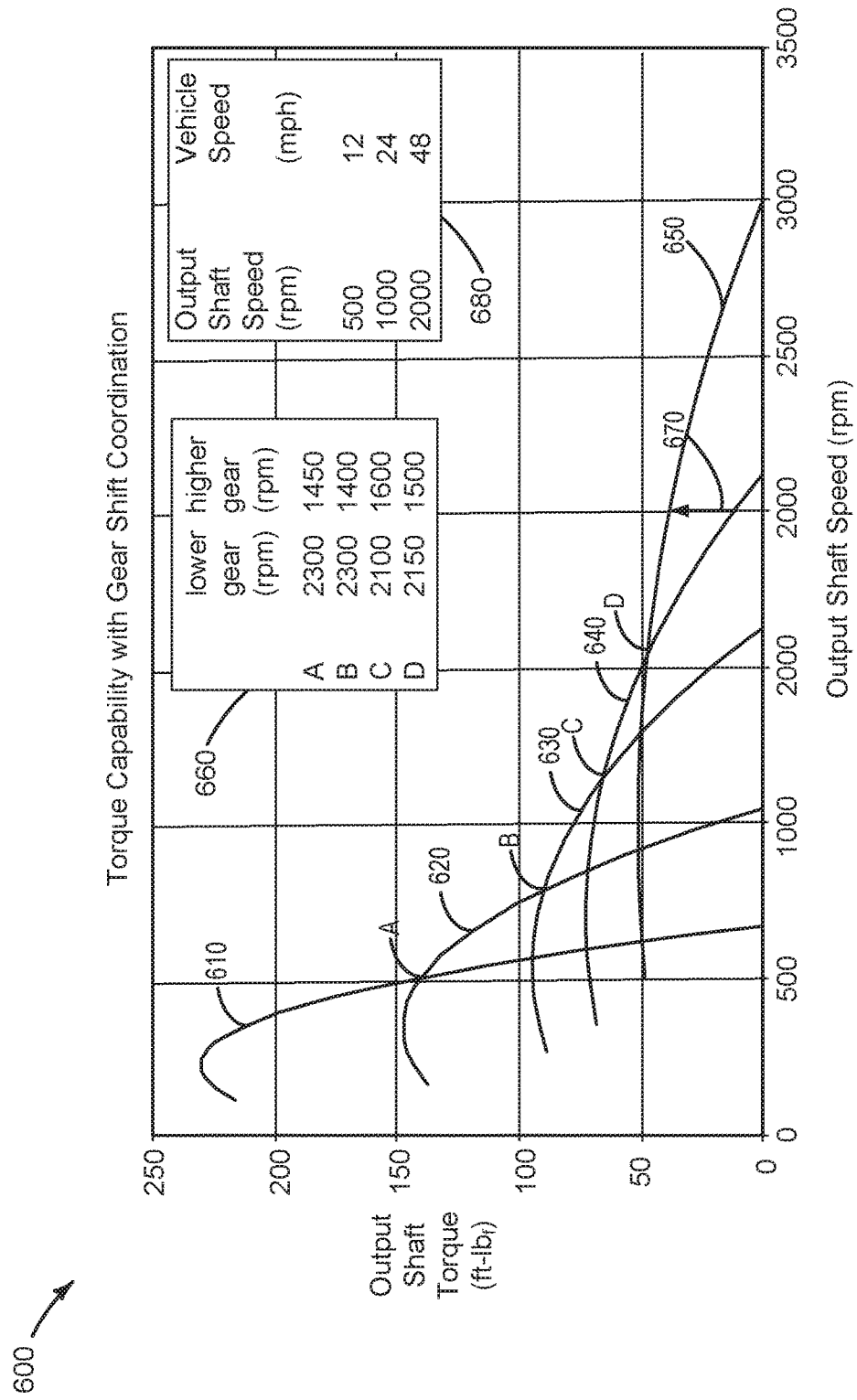
FIG. 6 shows an example plot of torque vs. shaft speed.
Figure 7:
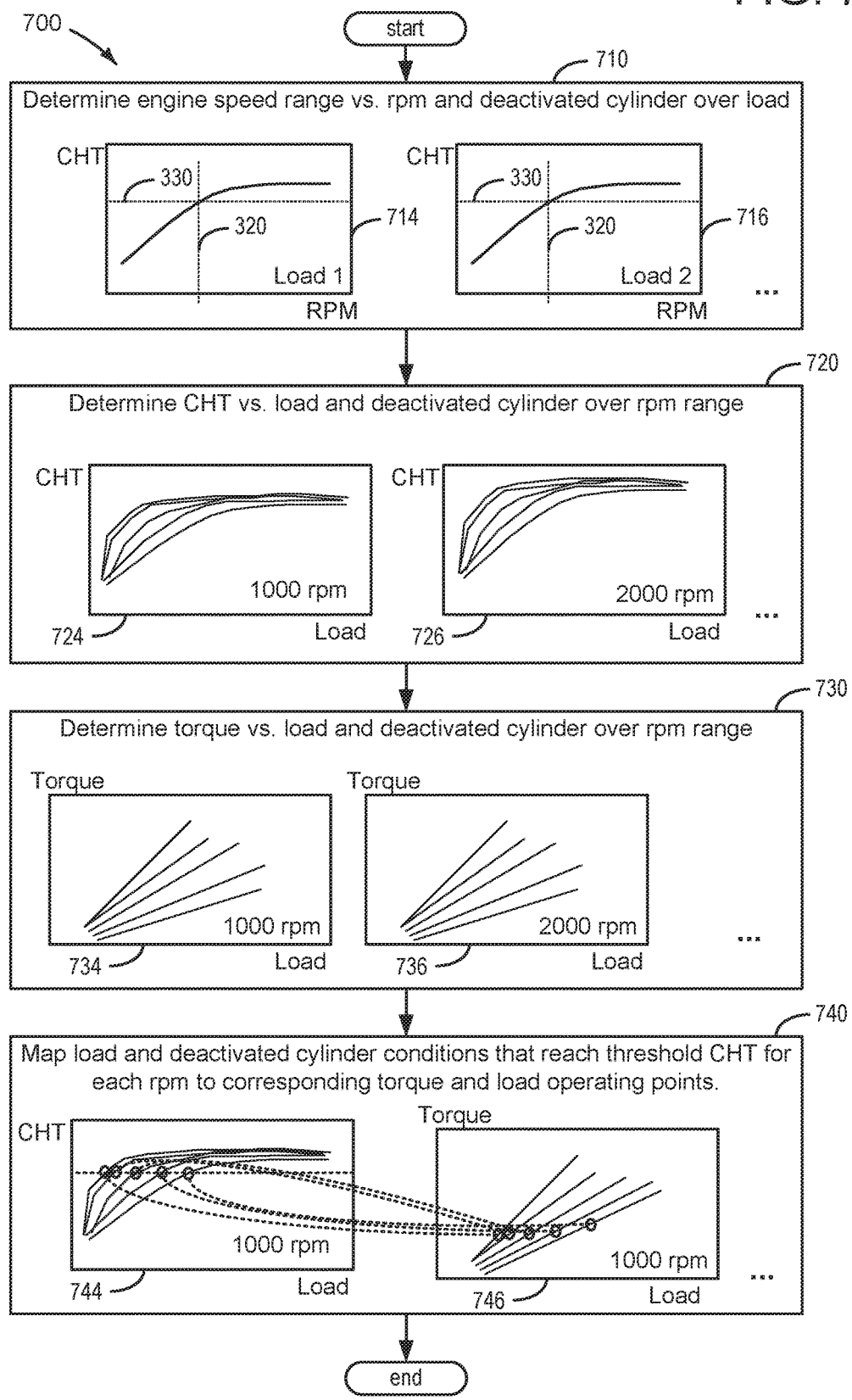
FIGS. 7-10 show flow charts for example routines.
Figure 8:
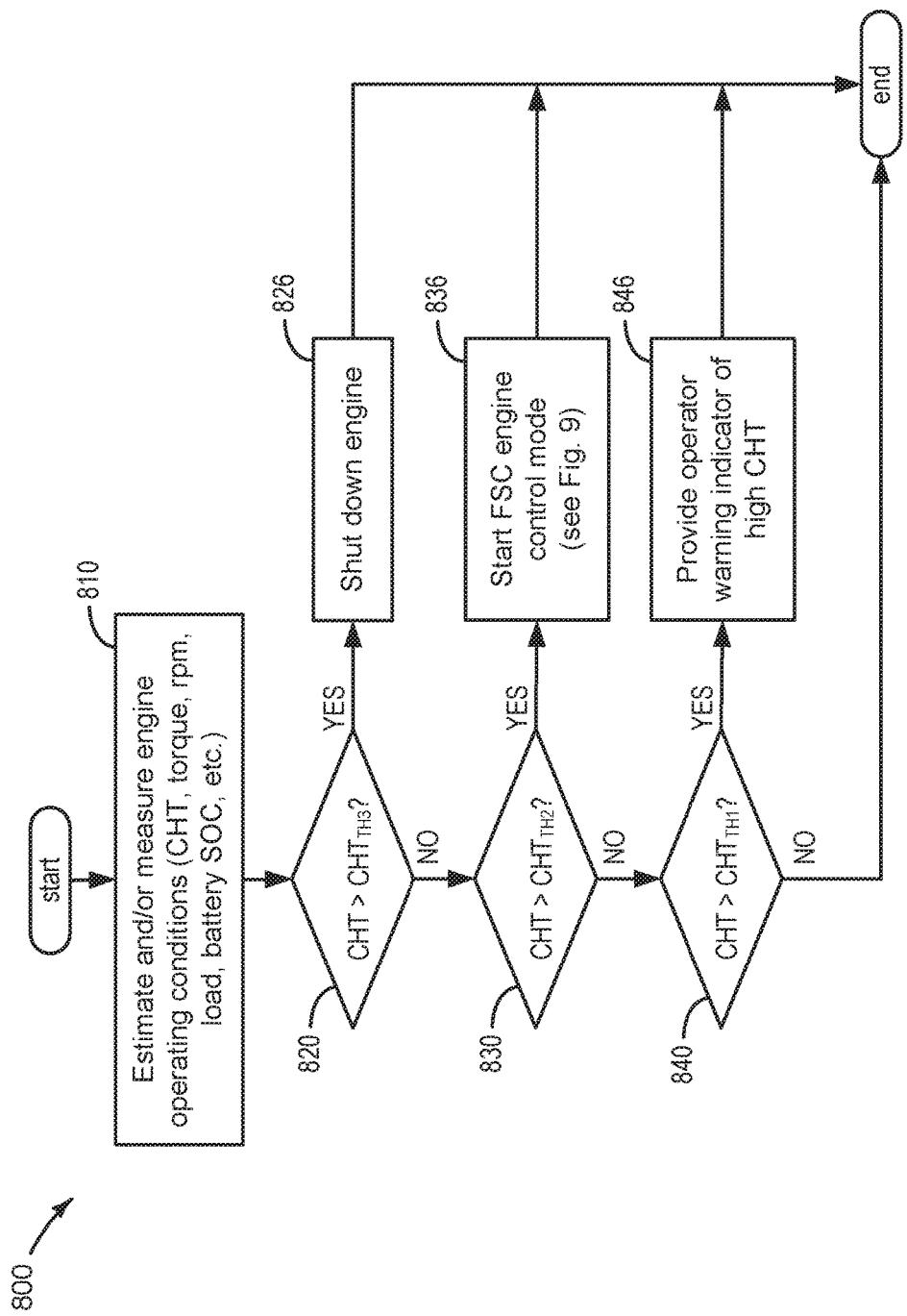
Figure 9:
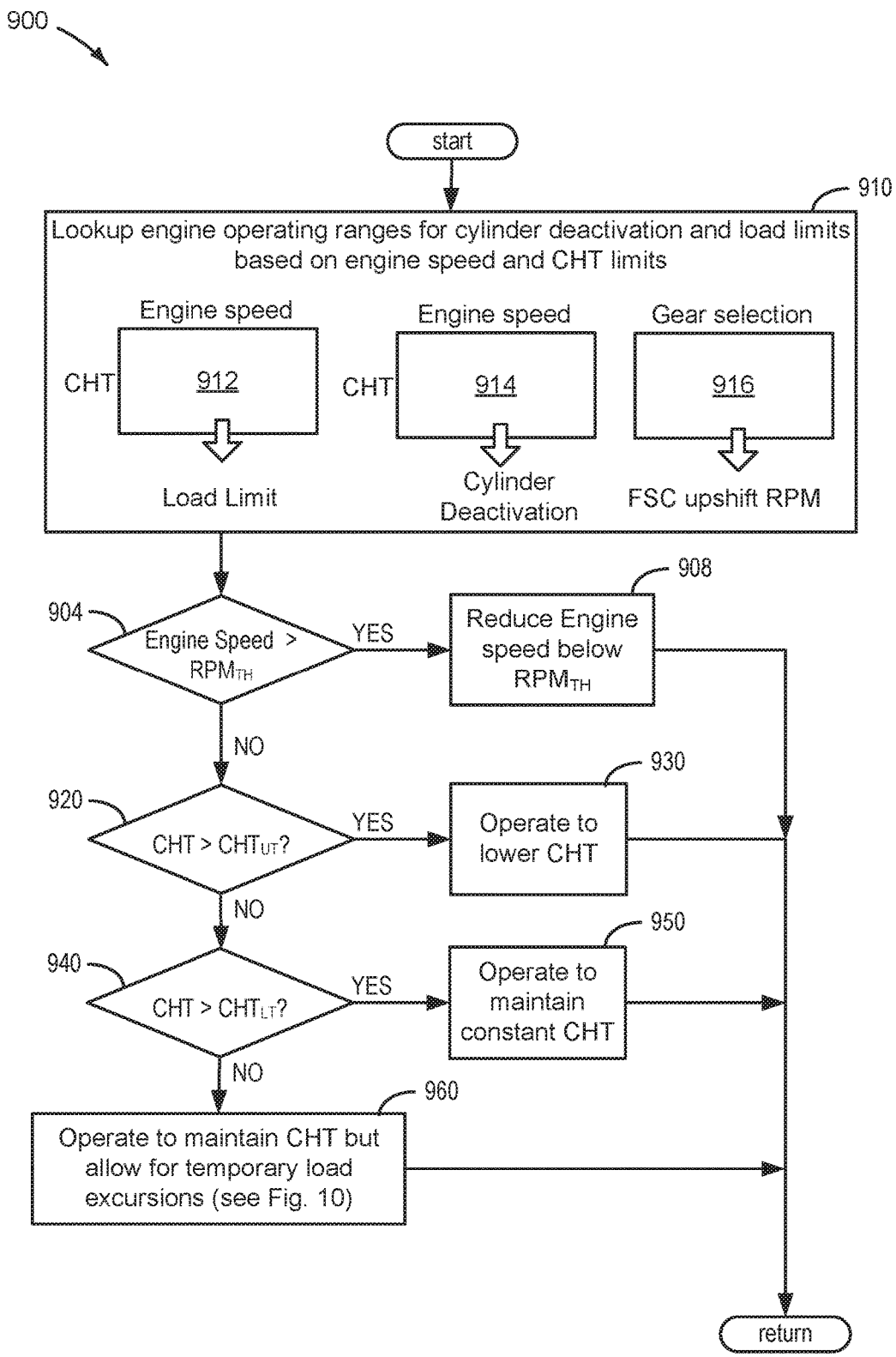
Figure 10:
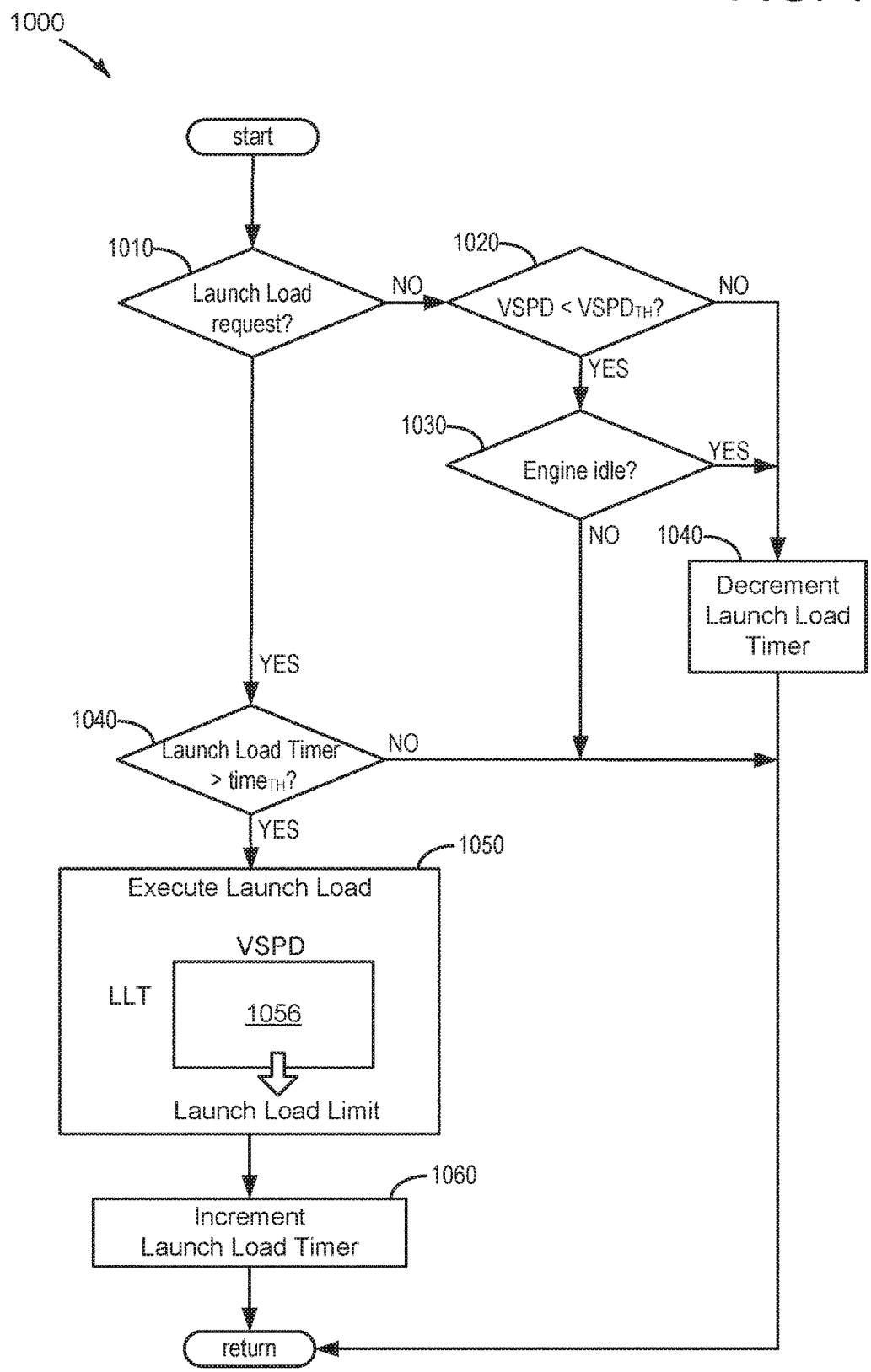
Figure 11:
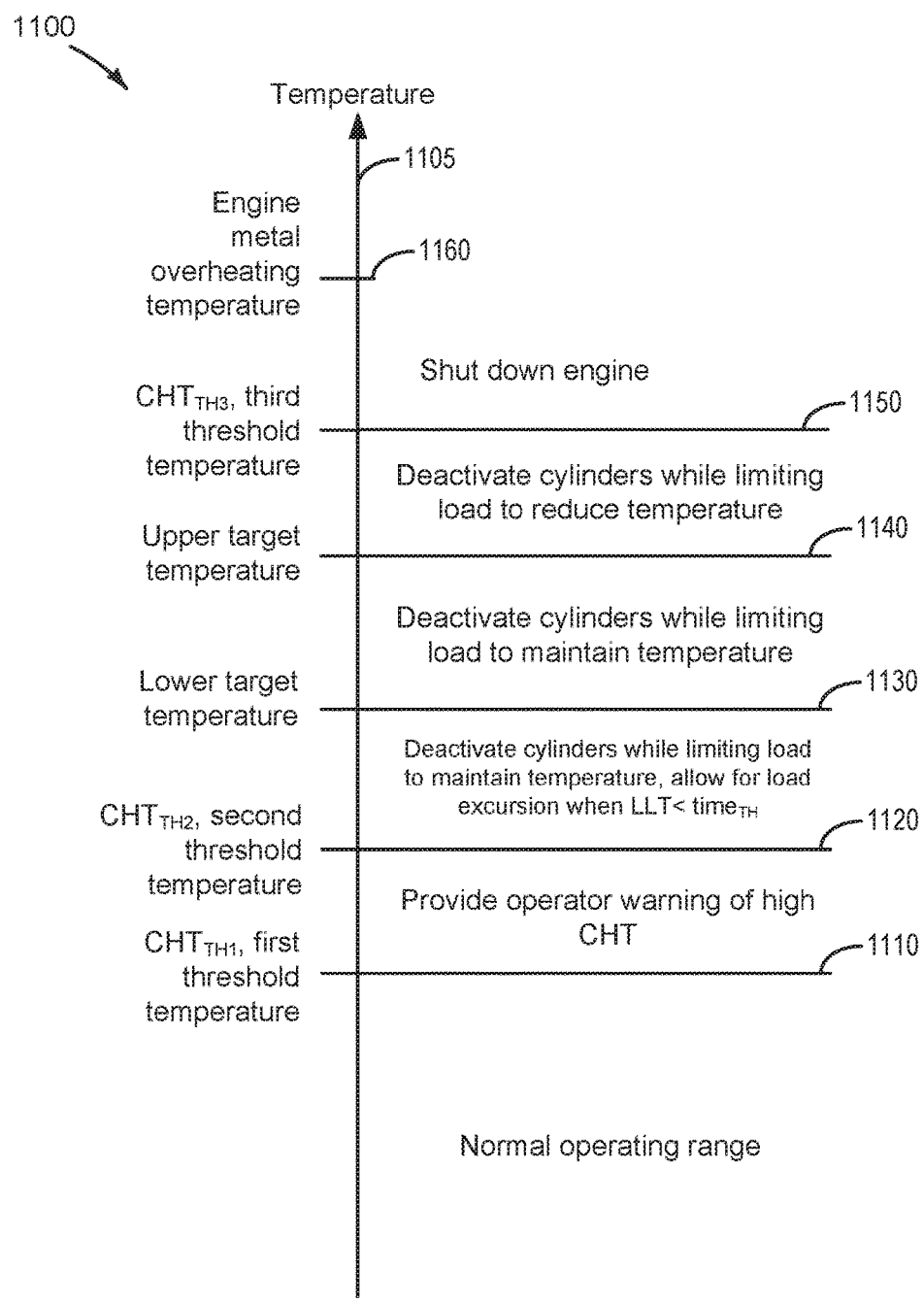
FIG. 11 shows a schematic depicting an example overview of a fail-safe cooling strategy for a turbocharged engine.
Figure 12:
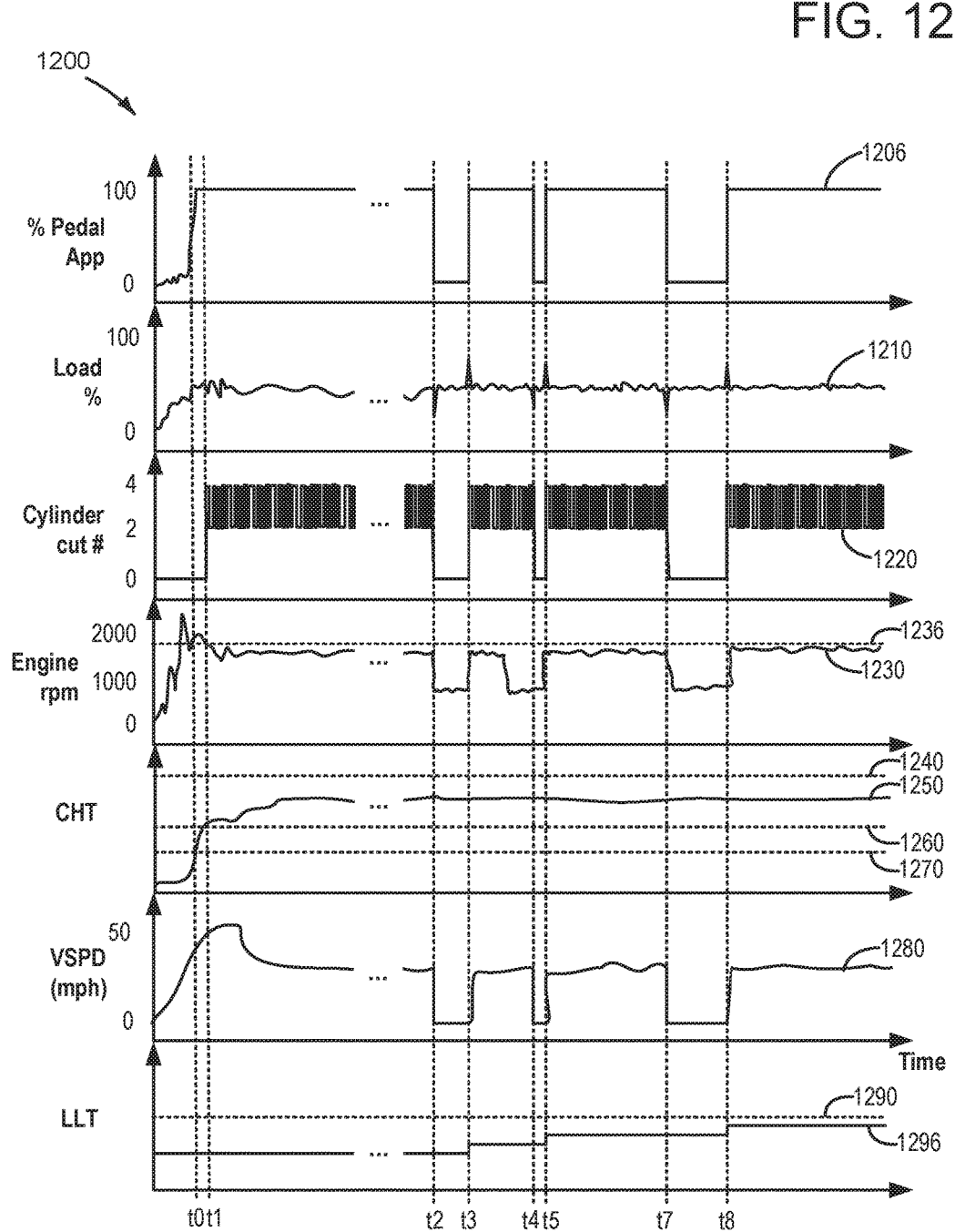
FIG. 12 is an example timeline showing vehicle operating conditions during execution of a fail-safe cooling strategy for a turbocharged engine.

FIG. 1 illustrates an example of a turbocharged engine, including an intake compressor, exhaust turbine, waste gate and engine controller. FIG. 2 illustrates an example of an exhaust manifold temperature sensor that may be used to provide an indication of engine cylinder head temperature. FIGS. 3-5 are example plots of cylinder head temperature vs. engine speed, cylinder head temperature vs. load, and torque vs. load respectively, and FIG. 6 is a plot of torque vs. output shaft speed. FIG. 7 shows an example method illustrating how FIGS. 3-6 can be used to map engine operating conditions for predetermining engine operating points in a fail-safe cooling strategy (FSC) for mitigating engine overheating while maintaining vehicle driveability and vehicle operability. FIGS. 8-10 are flow charts illustrating example routines for a method of deactivating one or more engine cylinders while limiting load of one or more active cylinders based on an engine speed and a cylinder head temperature, and FIG. 11 illustrates an overview of the method. FIG. 12 is an example timeline illustrating vehicle operating conditions while deactivating engine cylinders and limiting engine load after coolant loss is detected.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Exhaust manifold 48 may be an integrated exhaust manifold or a separate exhaust manifold. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Further, a compressor bypass passage 86 may be provided in some examples to limit pressure provided by compressor 162. Flow though bypass passage 86 is regulated via valve 85. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; cylinder head temperature (CHT) and/or exhaust manifold temperature (EMT) from temperature sensor 59, a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may also communicate with a message center 196. The message center 196 may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Turning now to FIG. 2, it illustrates a partial cross-section 200 of an integrated exhaust manifold (IEM). As an example, exhaust manifold 48 may be an IEM. An IEM may include integrated cooling passages 230 therein for circulating coolant fluid, thereby improving heat removal from the exhaust gas flow through the exhaust port 220. IEM's may be fabricated from aluminum which may be lighter than conventional cast iron separate exhaust manifolds, thereby improving fuel economy and horsepower, but may be more susceptible to engine overheating during cooling system degradation because of lower metal melting temperatures. For example, the engine melting temperature for an aluminum cylinder head may be lower than the engine melting temperature for a non-heat treated aluminum head, which may be lower than the engine melting temperature for a heat treated cylinder head.

An exhaust manifold temperature (EMT) sensor 250 may be mounted directly into the body of the IEM and may be used to provide engine controller 12 with an indication of the exhaust manifold temperature, engine temperature, cylinder head temperature, and/or engine exhaust temperature. Furthermore, EMT sensor 250 may be used to signal a cooling system degradation and/or loss of coolant, or to initiate providing operator indication of coolant temperatures approaching cooling a boiling point.

In another example, a temperature sensor such as a thermocouple may be mounted directly into the body of exhaust manifold 48 in order to provide controller 12 with an indication of engine cylinder temperature. In other examples, engine cylinder temperature may be measured by a temperature sensor located at the engine cylinder, engine cylinder head, and the like. In this manner, engine cylinder temperatures may be measured and communicated to controller 12 during engine operation. As described above, an EMT, CHT, or another engine cylinder temperature may be used to measure and communicate engine cylinder temperature and may be used to indicate engine overheating.

In high-specific power output engines, particularly turbocharged engines, engine cylinder temperatures greater than an overheating threshold temperature 330 may be generated at high load even when one or more engine cylinders are deactivated. Deactivating an engine cylinder may include stopping fuel injection to the engine cylinder. In this manner the deactivated engine cylinder may be air-cooled by pumping intake air may through an engine cylinder in the absence of fuel injection and combustion to mitigate engine overheating. As a further example, deactivating an engine cylinder may further comprise maintaining intake and exhaust cylinder valves in a closed position. In this manner, a deactivated engine cylinder may be air-cooled by compressing and expanding air trapped in the deactivated engine cylinder, in the absence of fuel injection, combustion and air flow.

Deactivating cylinders may include deactivation of one or more cylinders at a time, for example, alternately deactivating a bank of cylinders, or distributively deactivating one or more engine cylinders. Distributively deactivating one or more engine cylinders may include deactivating one or more engine cylinders in a round robin fashion wherein the deactivation of engine cylinders is cycled or distributed uniformly amongst the engine cylinders.

The number of deactivated cylinders may be chosen based on vehicle and engine operating conditions. For example, a larger number of cylinders may be deactivated as engine speed is increased and as engine cylinder temperatures increase. On the other hand, as engine speed is decreased and/or and engine cylinder temperatures decrease, a smaller number of cylinders may be deactivated. As a further example, an even number of cylinders may be deactivated to mitigate engine noise, vibration and harshness (NVH). As a further example, a number of cylinders may remain active during engine operation to provide engine torque for maintaining vehicle operability and vehicle driveability. For example, three cylinders may be deactivated in a six cylinder engine, and 4 cylinders may be deactivated in an eight cylinder engine.

Engine overheating may refer to an engine cylinder temperature (e.g., EMT, or CHT) exceeding an engine metal overheating temperature 1160 (see FIG. 11), above which engine metal components overheating may occur. For example an engine metal overheating temperature 1160 may correspond to an engine metal or cylinder metal overheating temperature above which engine metal overheating may occur.

FIGS. 3-7 illustrate a method of characterizing engine operating regions (e.g., regions of engine speed, number of deactivated cylinders, load, and other engine operating conditions) for an engine, for example a turbocharged engine. The engine characterization may be performed in the absence of coolant to correlate engine operating conditions to engine cylinder temperature or CHT during cooling system degradation. Furthermore, CHT may comprise a terminal engine cylinder temperature, wherein the terminal engine cylinder temperature may be a steady-state engine cylinder temperature. The engine cylinder temperature may further comprise a hot spot terminal temperature, wherein the hot spot terminal temperature may be measured by a temperature sensor at an engine cylinder location that is prone to overheating. Characterizing engine operating regions may be predetermined and performed offline and/or may be performed online while a vehicle is in operation. Characterization of engine operating regions in the absence of coolant may help to determine engine operating conditions in response to cooling system degradation while maintaining vehicle driveability and vehicle operability and while reducing engine overheating.

Turning now to FIG. 3, it illustrates a plot 300 of CHT vs. engine speed while the engine cooling system is off (e.g., no coolant flow and/or loss of coolant) at a constant load and constant number of deactivated cylinders. In FIG. 3, CHT curve 310 may correspond to a cylinder hotspot temperature measured by a temperature sensor located at a position of an engine cylinder that is prone to overheating. In general, CHT may steadily increase with increasing engine speed, leveling out at higher engine speeds. Additional CHT curves may be determined by measuring CHT with engine speed and varying the number of deactivated cylinders and the load of the one or more active cylinders. As an example, by comparing CHT curves, CHT may be found to decrease when the number of deactivated cylinders is increased, and when limiting engine load is intensified. Furthermore, a threshold engine speed 320 may be found above which the engine cannot be air-cooled sufficiently. For example, above a threshold engine speed 320, CHT may exceed an overheating threshold temperature 330, despite deactivating one or more engine cylinders and limiting engine load. As another example, above threshold engine speed 320, deactivating one or more engine cylinders while limiting engine load may not sufficiently cool an engine to decrease CHT below an overheating threshold temperature 330. In FIG. 3, overheating threshold temperature 330 is approximately 450° F., however overheating threshold temperature may vary for different engine types, engine cylinder materials of construction, and the like.

The number of deactivated cylinders may refer to the number of deactivated cylinders at any instant during engine operation. Nevertheless, cylinder deactivation may be distributed amongst all or some of the engine cylinders. For example, cylinder deactivation may be cycled or rotated amongst all engine cylinders in a prescribed uniform or non-uniform manner to mitigate engine overheating.

Next, FIG. 4 illustrates an example plot 400 of CHT vs. load at constant engine speed (e.g., 1000 rpm) while the engine cooling system is off (e.g., no coolant flow). CHT may represent a steady-state terminal cylinder hotspot temperature. Curves 410, 420, 430, 440, and 450 illustrate engine CHT for the cases of zero, one, two, three, and four deactivated cylinders, respectively. In general, CHT may increase with increasing load, leveling out at higher loads. Furthermore, CHT may decrease as the number of deactivated cylinders increases. The intersection of curves 410, 420, 430, 440, and 450 with the overheating threshold temperature 330 may be used to determine engine load limits under which the engine may be operated for each number of deactivated cylinders, while the cooling system is off in order to maintain CHT below the overheating threshold temperature. Additional plots of CHT vs. load at other engine speeds below the threshold engine speed 320 may be used to map the loads under which the engine may be operated for each number of deactivated cylinders. In this manner, the engine load limits over a range of engine speeds and numbers of deactivated cylinders may be learned. As an example, engine load or the load to one or more cylinders may be limited by one or more of opening a waste gate 75 to reduce intake compression, opening a valve 85 in bypass passage 86 to reduce intake compression, closing throttle 64, and the like.

Turning now to FIG. 5, it illustrates an example plot 500 of torque output vs. load at constant engine speed (e.g., 1000 rpm). Curves 510, 520, 530, 540, and 550 illustrate engine torque for the cases of zero, one, two, three, and four deactivated cylinders, respectively. In general, torque output may increase approximately linearly with increasing load. Furthermore, torque output may decrease as the number of deactivated cylinders increases. Additional plots of torque output vs. load may be generated for other engine speeds below the threshold engine speed 320 and may be used to map the engine torque output corresponding to the engine load and number of deactivated cylinders. In this manner, output torque over a range of engine speeds and numbers of deactivated cylinders when the cooling system is off may be learned. In order to maintain vehicle operability and vehicle driveability, deactivating one or more cylinders while limiting load may further be based on increasing torque, in addition to engine speed and CHT.

Turning now to FIG. 7, it shows a flow chart illustrating an example method 700 of determining engine operating conditions for deactivating one or more cylinders while limiting load when the cooling system is off as a fail-safe cooling strategy for a turbocharged engine. As an example, method 700 may be performed to characterize and engine for predetermining fail-safe cooling strategy operating conditions. For example, predetermining fail-safe cooling strategy operating conditions may be used for open-loop control strategies if cooling fluid is lost or if the cooling system is degraded. Furthermore, the fail-safe cooling strategy operating conditions may be used for open-loop control to reduce engine overheating in response to degradation of an engine component. Method 700 may also be performed while the vehicle is operating. For example, one or more engine operating conditions may be measured and provide input to a closed-loop feedback control scheme for preventing engine overheating if cooling fluid is lost or if the cooling system is degraded.

Method 700 begins at 710, where CHT vs. engine speed (e.g., plot 300) is measured over a range of engine loads and deactivated cylinders as shown by 714, 716, etc. A threshold engine speed 320 may be determined using 714, 716, etc. from the engine speed corresponding to an overheating threshold temperature 330. Above threshold engine speed 320, deactivating one or more engine cylinders while limiting engine load may not reduce engine overheating.

Next method 700 continues at 720, where CHT vs. load (e.g., plot 400) may be measured over a range of deactivated cylinders and engine speeds below the threshold engine speed 320 as shown by 724, 726, etc. For example, as shown at 724 and 726, CHT vs. load plots are generated at 1000 rpm and 2000 rpm, respectively. CHT vs. load measurements may be further performed at other engine speeds below a threshold engine speed 320 to achieve a finer characterization of the engine operation. Next, at 730, method 700 measures torque vs. load (e.g., plot 500) over a range of deactivated cylinders and engine speeds below the threshold engine speed 320 as in 734, 736, etc. For example, as shown at 734 and 736, Torque vs. load plots are generated at 1000 rpm and 2000 rpm, respectively. Torque vs. load measurements may be further performed at other engine speeds below a threshold engine speed 320 to achieve a finer characterization of the engine operation.

Next, method 700 continues at 740 where the load and deactivated cylinder conditions corresponding to the overheating threshold temperature 330 in 724, 726, etc. are mapped to the corresponding torque vs. load plots (e.g., 734, 736, etc.) as shown by 744 and 746. In this manner, the torque output corresponding to engine speed, load, and number of deactivated cylinders can be determined for operating an engine below an overheating threshold temperature 330 and below a threshold engine speed 320 when the cooling system is degraded. For example, CHT may be reduced by increasing the number of deactivated cylinders and/or by decreasing an engine load. As a further example, torque output may be increased by increasing engine load and/or by decreasing the number of deactivated cylinders, while maintaining CHT below an overheating threshold temperature 330. Accordingly, vehicle driveability and vehicle operability can be achieved while deactivating one or more engine cylinders while limiting engine load in response to cooling system degradation.

The data plotted in 724, 726, etc., 734, 736, etc., and 744, 746, etc. may be stored in the form of lookup tables held in RAM 108 or KAM 110 of controller 12. Accordingly, in response to cooling system degradation or when fail-safe cooling is initiated, controller 12 can reference predetermined lookup tables to determine appropriate operating conditions for a turbocharged engine to maintain vehicle driveability and vehicle operability. As described above, method 700 may also be performed online during engine operation. Method 700 ends after 740.

Turning now to FIG. 6, it illustrates an example plot 600 of output shaft torque vs. output shaft speed. Curves 610, 620, 630, 640, and 650 correspond to output shaft torque vs. output shaft speed for first, second, third, fourth and fifth gears, respectively. The points A, B, C, and D correspond to intersection points between first and second gear curves, second and third gear curves, third and fourth gear curves, and fourth and fifth gear curves, respectively. In general, output shaft torque may decrease with increasing output shaft speed. Furthermore, a reduction in output shaft torque with increasing output shaft speed may be lessened as the transmission is upshifted to higher gears. Accordingly, by upshifting to higher gears, a reduction in torque may be mitigated, thereby aiding in maintaining vehicle operability and vehicle driveability.

Furthermore, table 660 in FIG. 6 shows the engine rpm values at each of the intersection points A, B, C, and D, indicating that engine rpm can be maintained below 2300 rpm by upshifting. For example, a threshold engine speed 320 may be 2300 rpm. For example, at A, upshifting from first to second gear reduces the engine rpm from 2300 to 1450 rpm, and at B, upshifting from second to third gear reduces the engine rpm from 2300 to 1400 rpm. In this manner, upshifting may be used to achieve higher output shaft torque while maintaining engine rpm below a threshold engine speed 320 as compared to remaining in a constant gear without upshifting. For example, as indicated by arrow 670, upshifting from fourth gear to fifth gear at a shaft speed of 2000 rpm, increases output shaft torque. Furthermore, upshifting to a higher gear may mitigate torque reduction at higher output shaft speed while maintaining a number of deactivated cylinders, engine load, and CHT. Table 680 illustrates possible vehicle speeds corresponding to output shaft speeds. Vehicle speed may increase linearly with output shaft speed. Accordingly, upshifting to a higher gear may allow for increasing vehicle speed and mitigating torque reduction while maintaining a number of deactivated cylinders, engine load, and CHT.

Turning now to FIG. 11, it illustrates an overview of an example fail-safe cooling strategy based on cylinder head temperatures for a turbocharged engine. Plot 1100 shows several temperatures plotted along a temperature axis 1105. The temperature axis 1105 indicates relative temperatures and may not be shown to scale. Below a first threshold temperature 1110, $CHT_{TH1}$, the engine may be operated under normal operating conditions. For example, when the engine temperature is below $CHT_{TH1}$, the cooling system may be functioning normally (e.g., not degraded) and the fail-safe cooling strategy may not be initiated.

A CHT exceeding $CHT_{TH1}$ may indicate onset of cooling system degradation (e.g. loss of coolant). Accordingly, if CHT rises above $CHT_{TH1}$, a warning may be provided to the vehicle operator at a vehicle operator interface such as message center 196. Upon receiving the warning, the operator may reduce engine load by decelerating or stopping the vehicle in order to avert engine overheating and/or engine metal components overheating. Furthermore, the warning may notify and prepare the operator for initiation of fail-safe cooling.

If CHT rises above a second threshold temperature 1120, $CHT_{TH2}$, the fail-safe cooling strategy may deactivate one or more cylinders while limiting engine load to the one or more cylinders in order to prevent engine metal component overheating while maintaining vehicle driveability and vehicle operability. When CHT is greater than $CHT_{TH2}$, but less than a lower target temperature 1130, the fail-safe cooling strategy may deactivate one or more cylinders while limiting the engine load to one or more cylinders in order maintain the current CHT. Furthermore, the fail-safe cooling strategy may allow for temporary load excursions above the engine load limits so that vehicle driveability and vehicle operability can be maintained. For example, if the fail-safe cooling strategy is active, launching a vehicle from rest or temporary acceleration of the vehicle where engine loads rise above engine load limits may be permitted for short durations, such as when a launch load timer (LLT) is less than a threshold time, $time_{TH}$.

When CHT is greater than a lower target temperature 1130 but less than an upper target temperature 1140, the fail-safe cooling strategy may deactivate one or more engine cylinders while limiting the load to the one or more engine cylinders. Because CHT is greater than a lower target temperature 1130, temporary load excursions above the fail-safe cooling strategy load limits may not be performed.

Next, if CHT exceeds the upper target temperature 1140, the fail-safe cooling strategy may deactivate one or more engine cylinders while limiting the load to one or more engine cylinders in order reduce CHT. For example, the fail-safe cooling strategy may increase the number of deactivated cylinders and/or reduce engine load in order to reduce CHT, while maintaining engine speed. When CHT is greater than an upper target temperature 1140, reducing CHT may mitigate engine shutdown by maintain CHT below a third threshold temperature 1150, $CHT_{TH3}$. Above $CHT_{TH3}$, the engine may be shutdown in order to avoid engine metal overheating, for example overheating of the engine metal components. Thus, $CHT_{TH3}$ may be a fail-safe operating temperature. For example $CHT_{TH3}$ may correspond to an overheating threshold temperature 330. Accordingly, $CHT_{TH3}$ may be set above the upper target temperature 1140, but below an engine metal overheating temperature 1160. For example, engine metal overheating temperature 1160 may correspond to an engine metal overheating temperature, and $CHT_{TH3}$ may be less than the engine metal overheating temperature 1160 by an amount corresponding to an operating margin. In this manner, if the engine temperature increases above $CHT_{TH3}$, the fail-safe cooling strategy may shut down the engine before CHT reaches the engine metal overheating temperature 1160, thereby reducing the risk of engine metal components overheating.

Turning now to FIGS. 8-10, they illustrate flow charts for an example method of performing a fail-safe cooling strategy for operation of a turbocharged engine. Method 800 begins at 810 where the engine operating conditions such as CHT, torque, rpm, load, battery state-of-charge (SOC), etc. are determined and/or measured. Method 800 continues at 820 where it is determined if CHT is greater than $CHT_{TH3}$. If CHT is greater than $CHT_{TH3}$, then the engine is shut down at 826, and method 800 ends.

If CHT is not greater than $CHT_{TH3}$, then method 800 continues at 830 where it is determined if CHT is greater than $CHT_{TH2}$. If CHT is greater than $CHT_{TH2}$, then fail-safe cooling (FSC) strategy engine control mode is initiated at 836 (see FIG. 9). If CHT is not greater than $CHT_{TH2}$, then method 800 continues at 840 where it is determined if CHT is greater than $CHT_{TH1}$. If CHT is greater than $CHT_{TH1}$, then a warning indicator may be provided at 846 to the operator indicating a higher than normal CHT. As described above the warning indicator may be provided to the operator via a message center 196 and the operator may adjust or reduce vehicle loads by decelerating or stopping the vehicle to mitigate engine overheating. Furthermore, the warning indicator may serve to alert the operator to the possible impending onset of fail-safe cooling strategy control mode of the engine operation. After 836 and 846, or if CHT is not greater than $CHT_{TH1}$ at 840, method 800 ends.

Turning to FIG. 9, it illustrates a method 900 for carrying out FSC control mode of a turbocharged engine. Method 900 is initiated from 836 of method 800 and begins at 910 where lookup tables are referenced by controller 12 for FSC operating ranges for cylinder deactivation and load limits based on engine speed and CHT limits. Lookup tables for these operating ranges may be predetermined according to method 700 and as explained above with reference to FIGS. 3-7. For example, as illustrated in 910, an FSC control mode may determine a load limit, number of deactivated cylinders, and FSC upshift RPM according to lookup tables for CHT vs. engine speed 912 and 914, and gear selection 916.

For a particular engine speed and CHT, lookup tables 912 and 914 may provide engine loads and numbers of deactivated cylinders under which an engine may operate while maintaining CHT below a third threshold temperature. Furthermore lookup tables 912 and 914 may be used to determine a threshold engine speed 320. There may be a plurality of engine loads and numbers of deactivated cylinders corresponding to an engine speed and CHT at which an engine may operate while maintaining CHT below a third threshold temperature. In one example, among the plurality of engine loads and numbers of deactivated cylinders corresponding to an engine speed and CHT at which an engine may operate while maintaining CHT below a third threshold temperature, the FSC strategy may determine the engine load and number of deactivated cylinders based on increasing torque, reducing load, and reducing the number of deactivated cylinders.

If engine speed is determined to be greater than a threshold engine speed ($RPM_{TH}$) at 904, then method 900 reduces the engine speed below $RPM_{TH}$ at 908. $RPM_{TH}$ may correspond to a threshold engine speed 320 above which deactivating cylinders while limiting load may not sufficiently maintain the engine temperature below a $CHT_{TH3}$. In other words above $RPM_{TH}$, CHT may increase above $CHT_{TH3}$ even though one or more engine cylinders are deactivated while limiting engine load. After reducing engine speed below $RPM_{TH}$, method 900 returns to method 800 at 836.

Method 900 continues at 920 where it is determined if CHT is greater than an upper target temperature 1140, $CHT_{UT}$. If CHT is greater than $CHT_{UT}$, then method 900 continues to 930 where an FSC control mode operates the turbocharged engine to reduce CHT in order to mitigate the risk of engine overheating. For example by deactivating one or more cylinders while limiting the load to the one or more cylinders according to lookup tables in 912, 914, and 916, an FSC control mode may reduce CHT and may maintain vehicle driveability and vehicle operability by reducing the risk of CHT increasing above $CHT_{TH3}$ leading to engine shut down, and increasing above an engine metal overheating temperature 1160 leading to engine metal components overheating. As an example, $CHT_{UT}$ may be set lower than $CHT_{TH3}$ by an operating margin. Accordingly, if CHT increases above $CHT_{UT}$, FSC control mode may increase the number of deactivated cylinders and intensify the engine load limits in order to reduce CHT and avoid engine shut down.

If CHT is not greater than $CHT_{UT}$, method 900 continues to 940 where it is determined if CHT is greater than $CHT_{UT}$. If CHT is greater than $CHT_{UT}$, then method 900 continues to 940 where an FSC control mode operates the engine to maintain CHT in order to mitigate the risk of engine overheating, while maintaining vehicle driveability and vehicle operability. For example, by deactivating one or more cylinders while limiting the load to the one or more cylinders according to lookup tables in 912, 914, and 916, FSC control mode may maintain CHT so that vehicle driveability and vehicle operability can be maintained.

If CHT is not greater than $CHT_{UT}$, then method 900 continues to 960 where FSC control mode operates the turbocharged engine to maintain CHT in order to mitigate the risk of engine overheating, while maintaining vehicle driveability and vehicle operability. In addition, FSC control mode operates the engine to allow for temporary load excursions above the engine load limits (see FIG. 10). After 930, 950, or 960, method 900 returns to method 800 at 836.

Turning now to FIG. 10, it illustrates a flow chart for a method 1000 of operating a turbocharged engine above FSC load limits during FSC control mode when executing an FSC strategy for reducing the risk of engine overheating. Method 1000 is performed when CHT is greater than $CHT_{TH1}$, but less than $CHT_{UT}$. Method 1000 begins at 1010, where it is determined if a launch load is requested. A launch load request may comprise any request by vehicle operator or engine controller to operate the engine above FSC load limits during FSC control mode. For example, during FSC control mode, a launch load may be requested when a vehicle may be launched from stopped position at a traffic light, or when making a turn at an intersection. As another example, a launch load request may comprise requesting engine operation that exceeds FSC load limits when accelerating to pass another vehicle, or when climbing a short ascent. A launch load request may be initiated, for example, when a vehicle operator depresses accelerator pedal 130 when accelerating a vehicle from rest.

If a launch load is requested, method 1000 continues at 1040 where it is determined if a launch load timer (LLT) is greater than a threshold time, $time_{TH}$. As an example, LLT may indicate a measure of an adjusted cumulative time that an engine is operated above FSC load limits during FSC control mode. Furthermore, LLT may be adjusted based on the vehicle operating conditions (refer to 1020 and 1030 discussed below). The threshold time may be set so that lengthy or consecutive launch load operation of the engine above FSC load limits is mitigated to reduce the risk of engine overheating while maintaining vehicle driveability and vehicle operability.

If LLT is greater than $time_{TH}$, then method 1040 does not perform the launch load and returns to method 900 at 960. If LLT is less than $time_{TH}$, then method 1000 continues at 1050 where the launch load request is executed. As an example, controller 12 may store a lookup table 1056 that specifies launch load limits for LLT and vehicle speed (VSPD) values. Lookup table 1056 values may be measured and predetermined for the turbocharged engine in a manner as discussed above for lookup tables 912, 914, and 916 in reference to FIGS. 3-7. For example, at lower values of LLT and VSPD, the launch load limit may be higher as compared to when LLT and VSPD values are higher in order to mitigate the risk of engine overheating while maintaining vehicle driveability and vehicle operability. As a further example, if LLT less than but nearly equal to $time_{TH}$, the launch load limit may be slightly greater than the load limit specified by the FSC control mode (e.g., load limits from 912, 914, 916, and method 900).

After initiating the launch load in 1050, method 1000 continues at 1060 where LLT is incremented. Furthermore, as LLT is incremented, method 1000 may reduce the launch load limit while executing the launch load in order to mitigate the risk of engine overheating while maintaining vehicle driveability and vehicle operability. After 1060, method 1000 returns to method 900 at 960.

Returning to 1010, if a launch load is not requested, method 1000 continues at 1020 where it is determined if VSPD is less than a threshold vehicle speed, $VSPD_{TH}$. If VSPD is not less than $VSPD_{TH}$, then method 1000 continues at 1030 where it is determined if the engine is idling. If either VSPD is less than $VSPD_{TH}$ at 1020, or if the engine is idle at 1030, method 1000 continues at 1040, where the LLT is decremented since the loads may be below the FSC load limits. If the engine is not idle at 1030, method 1000 returns to method 900 at 960.

In this manner, a method may comprise in response to coolant loss in a turbocharged engine, limiting engine speed below a threshold engine speed, and deactivating one or more engine cylinders while limiting engine load. The method may further comprise limiting engine speed below a threshold engine speed, and deactivating one or more engine cylinders while limiting engine load in response to an engine cylinder temperature of the one or more engine cylinders exceeding a second threshold temperature. Limiting engine speed below the threshold engine speed may comprise limiting engine speed below the threshold engine speed above which the engine cylinder temperature exceeds a third threshold temperature, the third threshold temperature being greater than the second threshold temperature. Setting a number of deactivated engine cylinders limiting engine load may be based on increasing available torque while maintaining the engine cylinder temperature below the third threshold temperature and while maintaining engine speed.

Setting the number of deactivated engine cylinders and limiting engine load may further be based on reducing load while maintaining the engine cylinder temperature below the third threshold temperature and while maintaining engine speed. Further still, setting the number of deactivated engine cylinders and limiting engine load may be based on reducing the number of deactivated cylinders while maintaining the engine cylinder temperature below the third threshold temperature and while maintaining engine speed.

The method may further comprise upshifting to a higher gear and increasing vehicle speed while maintaining the engine cylinder temperature below the third threshold temperature and while reducing engine speed. Deactivating the one or more engine cylinders while limiting engine load may comprise deactivating a larger number of engine cylinders and/or intensifying load limiting as engine speed is increased, and may further comprise deactivating a larger number of engine cylinders and/or intensifying load limiting as the engine cylinder temperature increases. Furthermore, deactivating the one or more engine cylinders while limiting engine load may comprise distributively deactivating the one or more engine cylinders. Limiting engine load may comprise one or more of increasing an opening of a waste gate valve, decreasing an intake air throttle, and increasing intake airflow through an intake compressor bypass passage.

The method may further comprise maintaining the engine cylinder temperature by deactivating the one or more engine cylinders while limiting engine load, during a first condition when the engine cylinder temperature is below an upper target temperature and above a lower target temperature, wherein the upper target temperature is less than the third threshold temperature, and wherein the lower target temperature is greater than the second threshold temperature. Further still, the method may comprise reducing the engine cylinder temperature during a second condition when the engine cylinder temperature is above the upper target temperature by deactivating the one or more active engine cylinders while limiting the load. During a third condition when the engine cylinder temperature is below the lower target temperature and when a launch load time is less than a threshold time, deactivating the one or more engine cylinders while limiting the load may comprise temporarily increasing engine load above a load limit. Further still, the method may comprise incrementing the launch load time when the load is increased above the load limit, and decrementing the launch load time when the turbocharged engine is idle or when the vehicle speed is above a threshold speed.

As another example, a method for a turbocharged engine may comprising during a condition when an engine cylinder temperature is above a second threshold temperature, deactivating a number of engine cylinders and limiting engine load, the number of deactivated engine cylinders and an engine load limit chosen based on increasing available torque while maintaining an engine speed below a threshold engine speed and maintaining the engine cylinder temperature below a third threshold temperature. The third threshold temperature may be greater than the second threshold temperature, and the method may further comprise deactivating a larger number of engine cylinders and and/or intensifying engine load limiting as engine speed increases and as engine cylinder temperature increases.

As another example, a method for a turbocharged engine may comprise deactivating different numbers of engine cylinders under different conditions and limiting engine load while maintaining an engine cylinder temperature below a threshold temperature, and maintaining an engine speed below a threshold engine speed. The method may further comprise upshifting to a higher gear and increasing vehicle speed while increasing available engine torque. Furthermore, the method may comprise deactivating different numbers of engine cylinders and limiting engine load in response to an engine component degradation to reduce engine overheating.

Turning now to FIG. 12, it illustrates a possible timeline 1200 of a vehicle operating under an FSC strategy after cooling system degradation is detected. Timeline 1200 is approximately to scale and depicts trends of % Pedal application 1206, Engine load 1210, cylinder cut 1220, RPM 1230, CHT 1250, VSPD 1280, and LLT 1296. In addition, $RPM_{TH}$ 1236, $CHT_{UT}$ 1240, $CHT_{TH2}$ 1260, and $CHT_{TH1}$ 1270 are depicted on the CHT trend plot, and $time_{TH}$ is depicted on the LLT trend plot. Cylinder cut 1220 indicates the number of deactivated cylinders.

Prior to t1, an operator depresses accelerator pedal 130 and a vehicle with a degraded cooling system (e.g., loss of coolant) is launched from a stopped position. Accordingly, % Pedal App increases from 0 to 100%, and the vehicle speed increases from 0 to approximately 50 mph. At time t0 prior to t1, CHT increases above $CHT_{TH1}$ due to the degraded cooling system and the launching event. Also prior to t1, cylinder cut is 0 because $CHT<CHT_{TH2}$, engine rpm increases rapidly from 0 to above 2000, and load increases steadily from 0 to approximately 40%.

At t1, CHT continues to increase due to the degraded cooling system, exceeding $CHT_{TH2}$, and activating FSC control mode. Accordingly, at t1, cylinder cut increases and load stabilizes, as FSC control mode deactivates one or more cylinders and limits load to the one or more active cylinders in order to reduce the risk of engine overheating. In addition, FSC control mode reduces the engine rpm (e.g., below a threshold engine speed $RPM_{TH}$ 1236). After t1, CHT begins to level out gradually reaching an approximately constant value between $CHT_{TH1}$ and $CHT_{TH2}$. Furthermore, VSPD is reduced to approximately 30 mph due to the load and engine rpm reductions. Accordingly, after t1, during vehicle operation, CHT is maintained below a third threshold temperature (not shown), and engine speed is maintained below a threshold engine speed $RPM_{TH}$ 1236, while maintaining vehicle driveability and vehicle operability.

Sometime after t1, at t2 the vehicle is stopped, for example at a traffic light or intersection. While the vehicle is stopped after t2 and prior to t3, the % Pedal App drops to 0%, cylinder cut drops to 0, engine rpm decreases below 1000 rpm, and VSPD decreases to 0 mph. At t3, a launch request is made, for example by the operator depressing accelerator pedal 130 indicated by % Pedal App increasing to 100%. Since $CHT<CHT_{UT}$, and $LLT<time_{TH}$, the launch load is executed, and LLT is incremented. Accordingly, the engine load is permitted to increase for a short duration at t3 above the FSC engine load limit as the vehicle is launched from a stopped position.

After t3, the engine load is reduced below the FSC engine load limit, and the vehicle continues to operate in FSC control mode. Additional vehicle stops at t4 and t7 and subsequent launch loads at t5 and t8 are performed. Accordingly, LLT 1296 is incremented at t5 and t8. From t3 to t8 and beyond t8, FSC control mode maintains CHT between $CHT_{TH2}$ and $CHT_{UT}$, thereby reducing the risk of engine overheating by deactivating one or more cylinders and by limiting the load to the one or more cylinders.

As will be appreciated by one of ordinary skill in the art, the method described in FIGS. 7-10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 turbocharged or high-specific power output engines operating on natural gas, gasoline, diesel, or alternative fuel configurations could use the present description to advantage. Furthermore, the present description may also be applied to non-turbocharged engines or non-high-specific power output engines to reduce engine overheating.

The invention claimed is:

1. A method for a turbocharged engine, comprising:
during a condition determined by a controller when an engine cylinder temperature is above a threshold temperature, deactivating a number of engine cylinders and limiting engine load, the number of deactivated engine cylinders and an engine load limit chosen by the controller based on increasing available torque while maintaining an engine speed below a threshold engine speed and maintaining the engine cylinder temperature below another threshold temperature.

2. The method of claim 1, wherein the another threshold temperature is greater than the threshold temperature, the method further comprising deactivating a larger number of engine cylinders and intensifying engine load limiting as engine speed increases and as engine cylinder temperature increases.

3. The method of claim 1 further comprising upshifting to a higher gear and increasing vehicle speed while maintaining the engine cylinder temperature below another threshold temperature and while reducing engine speed.

4. The method of claim 1, wherein deactivating the one or more engine cylinders is performed while limiting engine load and further comprises deactivating a larger number of engine cylinders and intensifying load limiting as engine speed is increased.

5. The method of claim 1, wherein deactivating the one or more engine cylinders and limiting engine load comprises deactivating a larger number of engine cylinders and intensifying load limiting as the engine cylinder temperature increases.

6. The method of claim 1, wherein limiting engine load comprises increasing an opening of a waste gate valve.

7. The method of claim 1, wherein limiting engine load comprises decreasing an intake air throttle.

8. The method of claim 1, wherein limiting engine load comprises increasing intake airflow through an intake compressor bypass passage.

9. The method of claim 1, wherein deactivating the one or more engine cylinders and limiting engine load comprises distributively deactivating the one or more engine cylinders.

10. A method for a turbocharged engine, comprising:
direct injecting fuel to engine cylinders;
deactivating different numbers of engine cylinders under different conditions and limiting engine load while:
maintaining an engine cylinder temperature below a threshold temperature by adjusting a turbocharger wastegate;
maintaining an engine speed below a threshold engine speed; and
upshifting to a higher gear and increasing vehicle speed while increasing available engine torque.

11. The method of claim 10, further comprising deactivating different numbers of engine cylinders and limiting engine load in response to an engine component degradation to reduce engine overheating.

12. The method of claim 10, wherein engine cylinder temperature comprises a cylinder head temperature measured in a cylinder head of the turbocharged engine.

13. A method for a turbocharged engine, comprising:
sensing a cylinder head temperature from a sensor in the cylinder head;
direct injecting fuel to engine cylinders;
taking different actions depending on a degree to which the sensed temperature is above a threshold, the different actions assigned to progressively higher temperature ranges, including
a first temperature range above normal where an operator warning is provided;
a second temperature range above the first where cylinders are deactivated while engine load is limited to maintain temperature, while allowing for load excursion when a vehicle launch duration is less than a threshold;
a third temperature range above the second where cylinders are deactivate while engine load is limited to maintain temperature;
a fourth temperature range above the third where the engine is shut down.

* * * * *